United States Patent [19]

Sakaida

[11] 4,091,241
[45] May 23, 1978

[54] STEREO INDICATING CIRCUIT FOR AN FM RECEIVER

[75] Inventor: Kaku Sakaida, Tokyo, Japan

[73] Assignee: Trio Kabushiki Kaisha, Tokyo, Japan

[21] Appl. No.: 750,857

[22] Filed: Dec. 15, 1976

[30] Foreign Application Priority Data

Dec. 19, 1975 Japan .............................. 50-172068[U]

[51] Int. Cl.² .............................................. H04H 5/00
[52] U.S. Cl. ................................. 179/15 BT; 307/100
[58] Field of Search ............... 179/15 BT, 1 G, 1 GQ, 179/100.1 TD, 100.4 ST; 328/262; 307/294, 100

[56] References Cited

U.S. PATENT DOCUMENTS

| 3,146,311 | 8/1964 | Wolff | 179/15 BT |
| 3,309,465 | 3/1967 | Frank | 179/15 BT |
| 3,345,464 | 10/1967 | Gillett | 179/15 BT |

Primary Examiner—Douglas W. Olms
Attorney, Agent, or Firm—Gerald J. Ferguson, Jr.; Joseph J. Baker

[57] ABSTRACT

A stereo indicating circuit for use with an FM receiver having a multiplex demodulator, a stereo indicator and a stereo-monaural mode selector, the stereo indicating circuit comprising a smoothing circuit having a short time constant for changing the mode of the FM receiver from stereo to monaural and immediately turning off the stereo indicator after the power switch of the FM receiver is turned off by utilizing the sharp voltage drop of said smoothing circuit.

4 Claims, 3 Drawing Figures

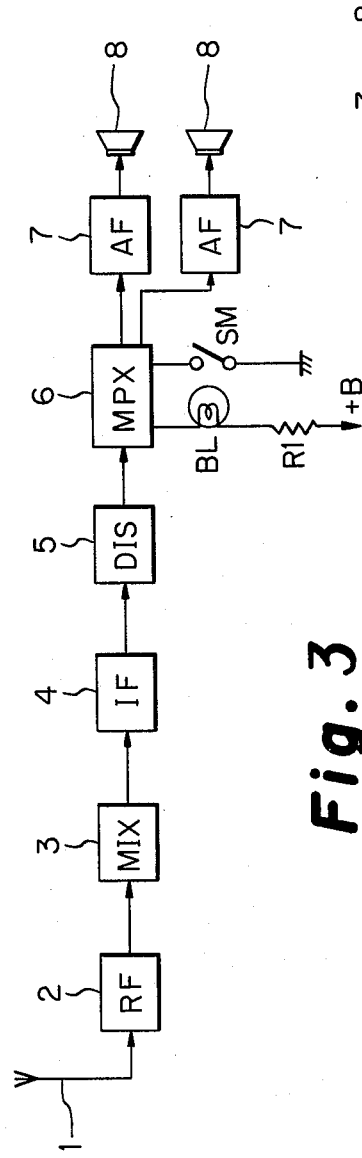
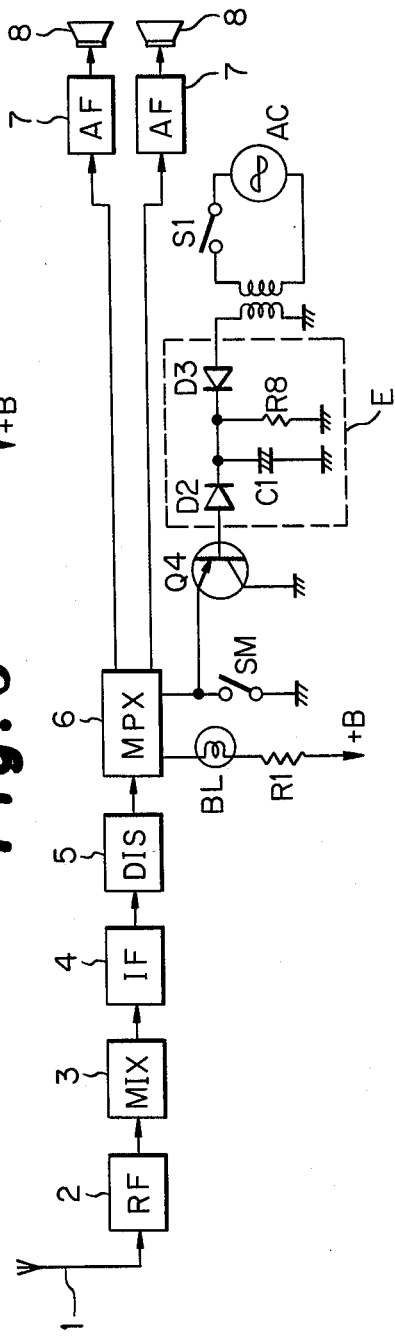
Fig. 1 (Prior Art)
Fig. 3

STEREO INDICATING CIRCUIT FOR AN FM RECEIVER

BACKGROUND OF THE INVENTION

1. Field of the Invention

This invention relates to an improved stereo indicating circuit for use with an FM receiver having a multiplex demodulator, a stereo indicator and a stereo-monaural mode selector.

2. Discussion of the Prior Art

In most FM stereo receivers, a stereo indicator such as a beacon lamp BL and a stereo-monaural mode selector SM are connected to a multiplex demodulator MPX as shown in FIG. 1 where the receiver is in its monaural mode when switch SM is closed and in its stereo mode when SM is open. Beacon lamp BL is also energized when the receiver is in its stereo mode. A smoothing circuit (not shown) applies the +B voltage to light the stereo indicator BL. In some prior art receivers, the time constant of the smoothing circuit is relatively short to prevent the stereo indicator from continuing to be lit for a while after the power switch of the FM receiver is turned off. However, there are certain problems in using a smoothing circuit having a short time constant to derive the +B voltage which lights the stereo indicator BL. Thus, the output voltage from a smoothing circuit with short time constant has ripples which undesirably affect the multiplex demodulator and cause some problems in stereo separation and distortion of the receiver. However, if the time constant of the smoothing circuit is too long, as in the case in some prior art receivers, BL tends to stay on after the main power switch has been turned off, as mentioned above.

SUMMARY OF THE INVENTION

The object of this invention is to provide an improved stereo indicating circuit in an FM receiver which can be changed from stereo to monaural mode where the stereo indicator is immediately turned off after the power switch of the FM receiver is turned off.

Other objects and advantages of this invention will be apparent from a reading of the following specification and claims taken with the drawing.

BRIEF DESCRIPTION OF THE DRAWING

FIG. 1 is a block diagram of a conventional prior art, FM receiver.

FIGS. 2 and 3 are circuit diagrams of two illustrative embodiments of the invention.

DETAILED DESCRIPTION OF PREFERRED EMBODIMENTS OF THE INVENTION

Figure 2:
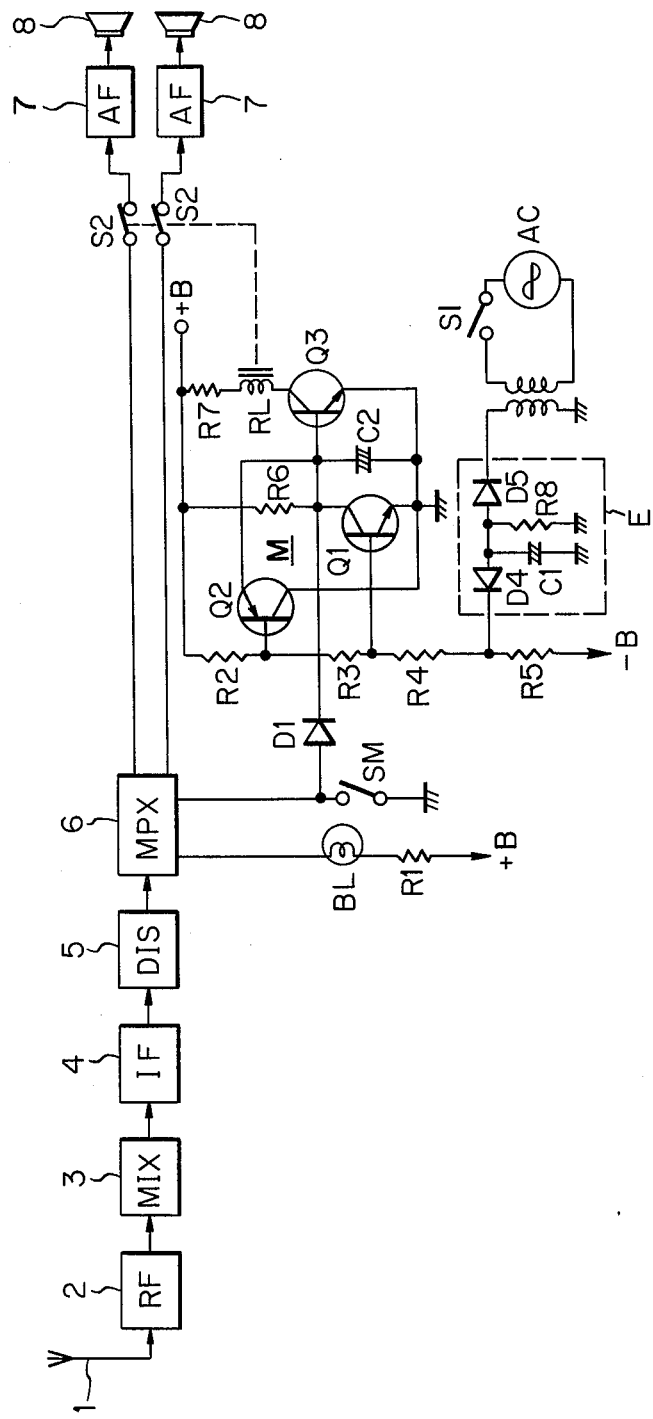

Reference should be made to the figures of the drawing where like reference numerals refer to like parts.

FIG. 2 is a circuit diagram of one embodiment of the invention utilizing a muting circuit M which is already present in certain FM receivers. MPX is a conventional multiplex demodulator, the +B power supply for which is obtained through a smoothing circuit (not shown) having long time constant. SM is a stereo-monaural mode selector switch where the receiver is in the monaural mode when the switch is closed. M is the muting circuit, Q1 is a switching transistor, RL is a relay, and the collector of transistor Q1 and stereo-monaural mode selector switch SM are connected through a diode D1. S1 is the power switch of the FM receiver, E is a smoothing circuit having a short time constant where the time constant is determined by condenser C1 and resister, R8, the time constant being substantially shorter than that of the smoothing circuit which provides the above-mentioned +B voltage.

In operation, the power switch S1 is turned on and a stereo broadcast is received by the FM receiver. Diode D4 in smoothing circuit E is reverse biased, transistor Q1 is turned off and relay RL is turned on. The collector voltage of the transistor Q1 is high and thus diode D1 is turned off whereby stereo indicator BL is lit. Reference may be made to "Electronics" magazine, Nov. 22, 1971, pages 62–66 and Hi-Fi Stereo Handbook, William F. Boyce, Howard W. Sams & Co., Inc., New York, 1974, pages 125 and 128 for circuitry illustrating conventional stereo indicators and stereo-monaural selectors, the foregoing matter being incorporated herein by reference.

Now, if power switch S1 is turned off, the electric charges on condenser C1 in smoothing circuit E will move toward −B voltage through diode D4, and at the same time, thereby turning transistor Q1 on. The collector voltage of Q1 will then be lowered to the level of earth so that diode D1 turns on. An earth potential is thus applied through diode D1 to MPX the same as if the stereo-monaural mode selector switch had been closed. Hence, the multiplex demodulator MPX turns to monaural and the lamp BL is immediately turned off when switch S1 is opened. Further, even if the time constant of the smoothing circuit (not shown) from which the +B is obtained for lighting the stereo indicator is sufficiently long to prevent problems with the operation of MPX, the stereo indicator BL wil nevertheless be immediately turned off when switch S1 is opened. A typical, but non-limiting, value of C1 might be $10\mu f$ while that of R8 might be $1.2K\Omega$.

FIG. 3 is a circuit diagram of another embodiment of this invention, where transistor Q4 and smoothing circuit E are added to a conventional FM receiver having a stereo indicator and a stereo-monaural mode selector. The operation is similar to that of the FIG. 2 embodiment in that D2 is normally reverse biased and Q4 is turned off. When switch S1 is opened, D2 is forward biased to turn Q4 on and apply an earth potential to MPX in the same manner as in FIG. 2.

As described above, the invention can be implemented by using a smoothing circuit with short time constant for extinguishing BL while a smoothing circuit with long time constant may be advantageously employed to derive the +B voltage for lighting BL. Indicator BL is immediately extinguished when the S1 is opened by utilizing the sharp voltage drop across C1. Further, in embodiments already utilizing a muting circuit, it does not cost much more than a conventional receiver.

What is claimed is:

1. A stereo indicating circuit for use with an FM receiver comprising
    a multiplex demodulator responsive to a composite stereo signal;
    a stereo-monaural mode selector switch for switching said receiver to either the stereo or monaural mode of operation;
    a stereo indicator lamp which is lit when said receiver is in said stereo mode of operation and which is off when said receiver is in said monaural mode of operation;
    an AC power source;

a first switch connected to said AC power source for de-energizing said receiver when said first switch is opened; and means responsive to said first switch being opened to place said receiver in its monaural mode of operation and thereby turn said stereo indicator lamp off when said receiver is de-energized.

2. A stereo indicating circuit for use with an FM receiver comprising a multiplex demodulator responsive to a composite stereo signal;

a stereo-monaural mode selector switch for switching said receiver to either the stereo or monaural mode of operation;

a stereo indicator lamp for indicating when said receiver is in said stereo mode of operation;

an AC power source;

a first switch;

a first smoothing circuit connected to said source of AC power by said first switch; and a voltage sensitive switch connected between said multiplex demodulator and said smoothing circuit for switching said receiver to said monaural mode of operation and turning said stereo indicator lamp off when said first switch is opened to de-energize said receiver.

3. A circuit as in claim 2 including a further smoothing circuit for providing voltage for lighting said stereo indicator lamp, the time constant of said first smoothing circuit being shorter than that of said further smoothing circuit.

4. A circuit as in claim 3 where said voltage sensitive switch is a diode which is reverse biased when said first switch is closed and is immediately forward biased after said first switch is opened due to said shorter time constant of the smoothing circuit.

* * * * *